United States Patent [19]

Aley

[11] 4,114,754
[45] Sep. 19, 1978

[54] CONTAINER INTEGRATED WORK STAND

[75] Inventor: Carl Lee Aley, Claymont, Del.

[73] Assignee: The Boeing Company, Seattle, Wash.

[21] Appl. No.: 745,713

[22] Filed: Nov. 29, 1976

[51] Int. Cl.² .............................................. B65D 85/68
[52] U.S. Cl. ................................... 206/319; 206/216;
248/13; 269/13
[58] Field of Search ....................... 206/0.82, 216, 319,
206/318, 45.19, 45.14, 335, 387; 269/296;
248/13, 19, 119 R

[56] References Cited

U.S. PATENT DOCUMENTS

| 2,428,500 | 10/1947 | Nutt | 206/319 |
|---|---|---|---|
| 2,917,165 | 12/1959 | Cadillac et al. | 206/335 |
| 2,933,183 | 4/1960 | Koelsch | 206/335 |
| 2,968,689 | 1/1961 | Johnson | 220/3.8 |
| 3,211,299 | 10/1965 | Metzrath | 206/319 |
| 3,229,809 | 1/1966 | Spadaro | 206/0.82 |
| 3,467,245 | 9/1969 | Kawawada | 206/45.14 |
| 3,580,467 | 5/1971 | Pieszak | 206/319 |
| 3,608,990 | 9/1971 | Arlitt et al. | 206/335 |

FOREIGN PATENT DOCUMENTS 680,564  10/1952  United Kingdom ................ 248/119 R Primary Examiner—William Price
Assistant Examiner—Bruce H. Bernstein
Attorney, Agent, or Firm—Felix J. D'Ambrosio; Edwin E. Greigg; Jack D. Puffer

[57] ABSTRACT

What follows is a description of a container and integrated work stand combination. Included are a body portion forming an enclosure which supports a component to be shipped and a lid portion which complements the body portion during shipping and also serves as part of a work stand for the component to be replaced at a replacement location. Within the body portion there is supplied supporting structure to which the component is mounted and secured, and to the lid portion there is included also supporting structure to which the component to be replaced is mounted. Both the lid portion and its supporting structure form the work stand.

8 Claims, 5 Drawing Figures

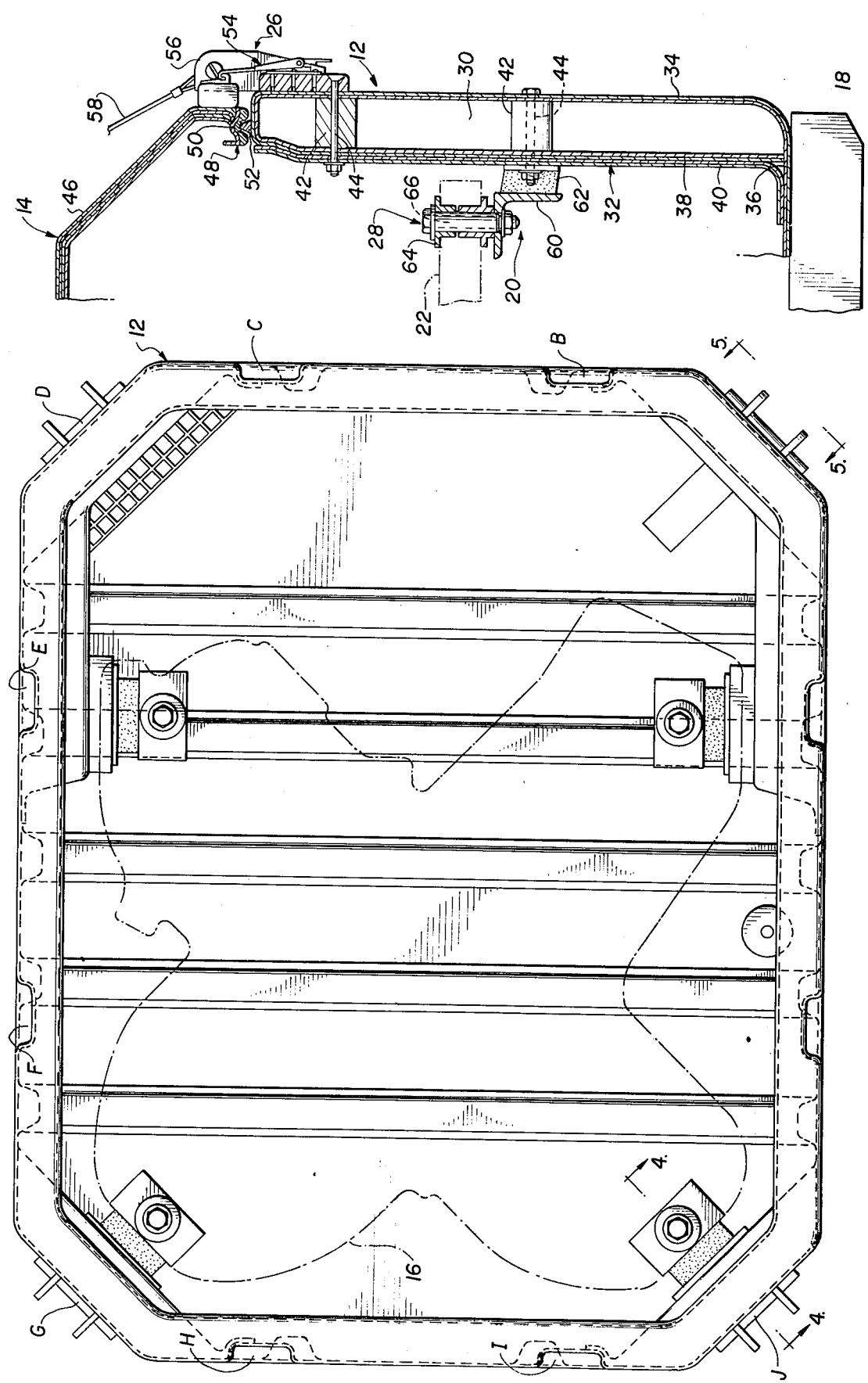

CONTAINER INTEGRATED WORK STAND

BACKGROUND OF THE INVENTION

1. Field of the Invention

The present invention relates generally to the field of containerized shipping, and in particular to a container which serves an integrated function. Preferably the present invention was developed for use in the aircraft industry and in particular the helicopter industry. Preferences notwithstanding, however, the present invention can be utilized in any application where the component to be shipped has a comparable component at the point of destination which must be accommodated while the shipped component is being installed. The container includes a lid work stand which allows components to be transferred between the aircraft and the container.

2. Description of the known Prior Art

In the helicopter field, as in others, it very frequently becomes necessary to replace used or defective parts at a remote location or even at a maintenance location. A problem arises as to handling the part to be replaced during the replacement operation. The problem becomes acute when the parts involved are difficult to handle such as a helicopter transmission. Then too it may be necessary to perform maintenance work on the replaced part before removing it or even shipping it back from the replacement cite.

It would be desirable to have a readily available means for handling the part to be replaced after it is removed. The present invention presents the existing state-of-the-art with such a readily available means. As far as I am aware there is nothing in the state-of-the-art which provides a similar means. The following patents are noted as illustrative of the state-of-the-art: U.S. Pat. Nos. 2,418,861; 2,428,500; 3,211,299 and 3,580,467. None of these, however, approaches the essence of the present invention. The U.S. Pat. No. 3,580,467 patent to Pieszak et al. comes closest to the present invention, but even this patent is quite far removed from the present invention as will become clear hereinafter.

OBJECTS AND SUMMARY OF THE INVENTION

It is a primary object of the present invention to provide a shipping container in which the lid serves an integrated function, i.e., as a part of the container and as a work stand.

It is another object of the present invention to provide a shipping container like that defined in the first stated object which has unique application in the aircraft field.

It is another object of the present invention to provide a shipping container like that defined in the first stated object which has unique applicaton in handling high mass components such as helicopter transmissions.

It is yet another object of the present invention to provide a shipping container like that defined in the first stated object in which both the container body and lid are reusable and simply constructed.

These and other objects are achieved by the present invention as embodied not only in the preferred embodiment, but also by all embodiments which reflect the stated objects and by all equivalents thereof. In particular, an exemplary embodiment of the invention which forms the preferred embodiment includes a body portion forming an enclosure for the component to be shipped and a lid portion which complements the body portion during shipping and also serves as part of a work stand for the component to be replaced at replacement location.

BRIEF DESCRIPTION OF THE DRAWING

FIG. 3. is a top cross sectional view of the container body portion with spaced mounting means for supporting a component.

FIG. 4. is a cross sectional view taken along the line 4—4 of FIG. 3.

DESCRIPTION OF THE PREFERRED EMBODIMENTS

Figure 1:
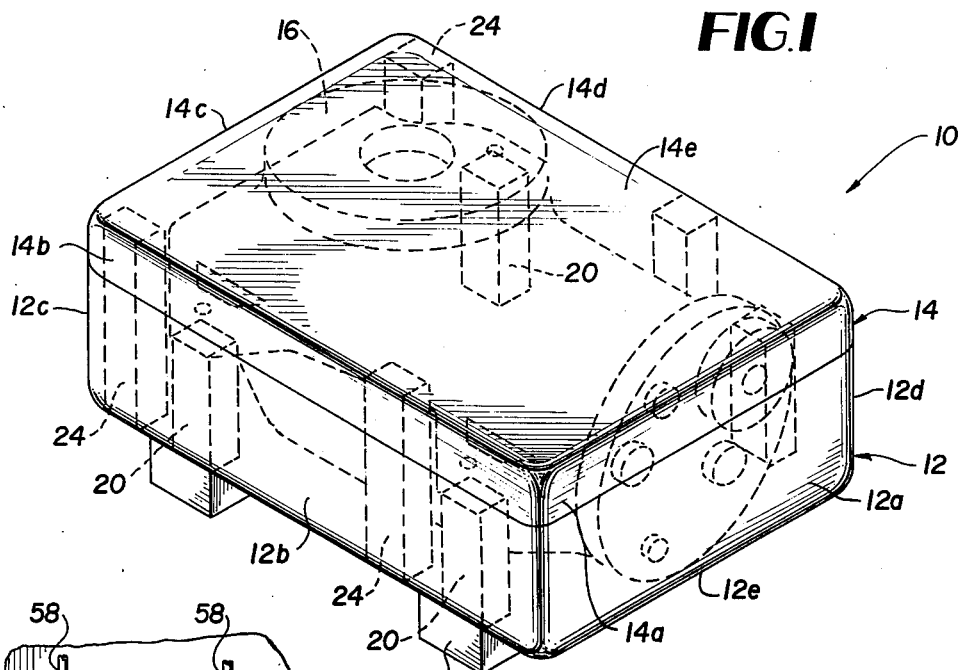
FIG. 1. is a schematic perspective illustration of the assembled container and work stand containing a transmission to be shipped.

Turning to FIG. 1, there is shown the assembled container and integrated work stand combination 10 comprising a body portion 12 and a lid portion 14. A component to be shipped 16 is shown in dashed lines mounted within the container. The component illustrated is a helicopter transmission. It should be understood that any category of component could be substituted for the transmission. As noted above, the present invention can be utilized in any application where the component to be shipped has a comparable component at the point of destination which must be accommodated while the shipped component is being installed.

The body portion 12 comprises front, side, rear and bottom walls 12a–12e, respectively, which are joined together to form an enclosure in which the component is secured for shipment. Externally, the body portion 12 includes a pair of transversely extending blocks 18 which serve as skids for the container. Internally, the body portion 12 includes a plurality of spaced mounting pads onto which the component is mounted and secured by means discussed below. Preferably, the mounting pads 20 are located at four stations within the body portion 12 which coincide with four mounting lugs 22 on the component 16.

Figure 5:
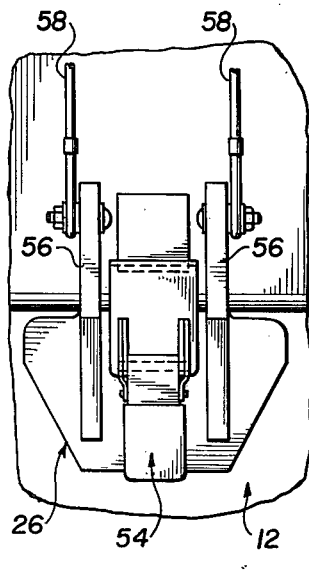
FIG. 5. is a detailed view seen along line 5—5 of FIG. 3.
Figure 2:
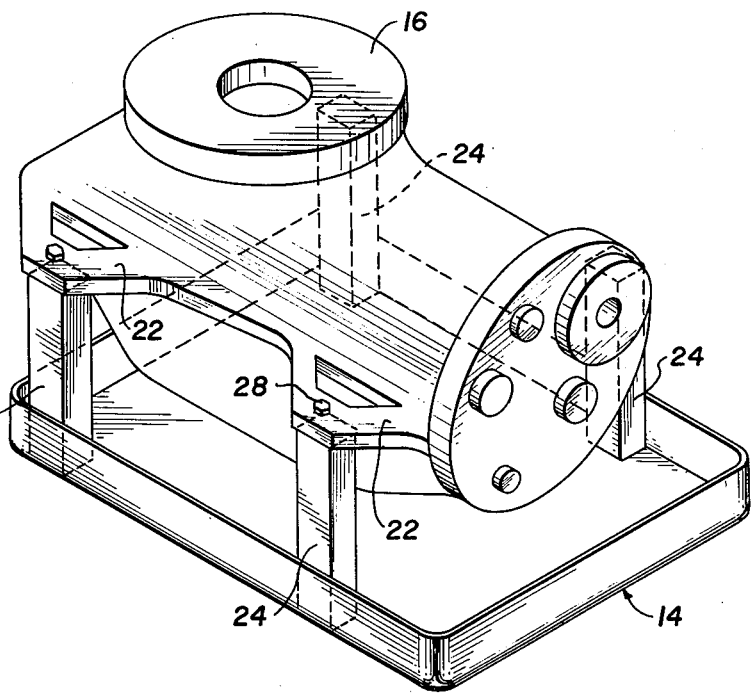
FIG. 2. is a schematic perspective illustration of the work stand supporting a transmission which is being replaced.

The lid portion 14 comprises at least the top wall of the container. As shown in FIG. 1, the lid portion 14 includes front, side, rear and top walls 14a–14j, respectively. Within the lid portion 14 there are disposed four mounting pads 24 which extend outwardly therefrom as shown in FIG. 2. The mounting pads 24 are staggered in their locations so that the relationship shown in FIG. 1 between the mounting pads 20 and 24 is achieved. In this way the body portion 12 and the lid portion 14 can be assembled into a closed container with the component 16 mounted and secured and ready for shipment. Fastening means are provided for fastening the body portion 12 to the lid portion 14. FIGS. 4 and 5 show one embodiment of the fastening means 26. As shown in FIG. 1, the component 16 can be shipped to any desired destination such as a remote location or a maintenance location and arrive undamaged. When the component has reached its destination, the lid portion 14 is removed and reversed as shown in FIG. 2 to serve as a work stand for the component which is to be replaced. In this capacity, the lid portion 14 solves the problem of replacement part placement during installation of the new component. In addition, the lid portion 14 permits easy access to the removed component for repair purposes, or subcomponent (e.g. filters, tubes, and the like) transfer between the component being removed and the replacement component before return shipping of the removed component.

If desirable, the removed component can be secured to the mounting posts 24 by any conventional means 28. For this purpose the spacing between the mounting posts 24 is identical to that of the mounting pads 20, so that the securement can be effected directly to the mounting lugs 22 of the component 16.

FIGS. 3-5 illustrate details of a production model container in which the body portion 12 is fabricated as a composite structure. The walls of the body portion 12 include a central core 30 of lightweight material, such as polyurethane foam, and a plurality of plies of a composite material, such as fiberglass, forming the inner, outer and bottom walls 32, 34 and 36, respectively. Preferably, the bottom wall 36, the outer wall 34 and part of the inner wall 38 are formed as a continuous formation of a plurality of plies as shown in FIG. 4. The inner wall is provided with an additional reinforcing part 40 made also as a formation of a plurality of plies. The reinforcing plies 40 are fastened to the plies of the inner wall 38 in a conventional manner. Between the inner and outer walls there is provided spacer blocks 42 secured by bolts 44 as shown. The number of blocks 42 is arbitrary except in those areas where mounting pads 20 and fastening means 26 are located.

The lid portion 14 is likewise made from a plurality of plies 46 of a composite material, such as fiberglass. A seal 48 is formed by the particular design of the body portion 12 and the lid portion 14. The lid portion 14 forms a groove 50 into which a preferably rubber strip 52 is received. The strip 52 is attached to the top surface of the body portion 12 in a conventional manner. The seal is achieved when the body portion 12 and the lid portion 14 are closed on each other by latches 54, forming the fastening means 26. Preferably, a latch 54 is located at each of the positions A-J indicated in FIG. 3. With these latches 54 located accordingly, an even pressure is applied about the periphery of the joined body portion 12 and lid portion 14 to effect the desired seal.

As shown in FIG. 5, lugs 56 and cable hooks 58 are provided at the four locations A, D, G and J (FIG. 3). The lugs and hooks are provided for hoisting the container to and from a vehicle or aircraft, or for stacking containers upon each other.

Within the body portion 12 the mounting pads 20 are preferably formed as shock absorbing pads comprising a bracket 60 having a vertical leg connected to a rubber block 62. The rubber block 62 in turn is connected by a bolt or bolts 44 to the block 42. To the horizontal leg of the bracket 60, a lug 22 of the component 16 to be fastened is secured by the fastening means 28. The fastening means 28 comprises a sleeve bushing 64 and a bolt 66. In this manner, imposed vibratory loads on the component 16 are reacted by the rubber block 62.

The container thus described achieves the above stated objects and provides the existing state-of-the-art with an integrated work stand container which is reusable and peculiarly suited for shipping a component and accommodating a component to be replaced.

What is claimed is:

1. A container and integrated work stand in combination, for shipping a component and supporting a like component to be replaced at a replacement location, comprising:
   a. a body portion having front, rear, side and bottom walls joined together to form an enclosure defining corresponding front, rear, side and bottom walls of the container;
   b. a plurality of mounting means attached to the body portion at selected locations within the enclosure and associated securing means for securing a replacement component to the mounting means, in a desired position, within the enclosure;
   c. a lid portion forming at least a top wall of the container and a base of the work stand;
   d. a like plurality of support means attached at selected locations to the lid portion for supporting, in a desired position, a like component to be replaced at the replacement location, said lid portion and support means forming the work stand; and
   e. fastening means for fastening the body portion to the lid portion, wherein each of said mounting means is spaced adjacent to a corresponding one of said support means within the enclosure defined by the assembled combination of the container.

2. The combination as defined in claim 1, wherein said mounting means comprise a plurality of discrete mounting pads, the selected locations of which align with corresponding means on the component when the component is received within the enclosure at its desired position, and wherein each mounting pad includes shock absorbing means.

3. The combination as defined in claim 1, wherein the support means comprise a plurality of discrete posts which extend outwardly from the lid portion, the selected locations of which align with corresponding means on the like component when the like component is to be supported in its desired position.

4. The combination as defined in claim 1, further comprising:
   f. securing means for securing, in the desired position, the like component to be replaced to the support means, wherein the support means comprise a plurality of discrete posts which extend outwardly from the lid portion, the selected locations of which align with corresponding means on the like component when the component is to be supported in its desired position.

5. The combination as defined in claim 1, wherein part of the fastening means is mounted on the body portion and another part is mounted on the lid portion.

6. The combination as defined in claim 1, wherein the lid portion forms the top wall and a portion of the side, front and rear walls of the container, wherein the top wall and said portion of the side, front and rear walls form an enclosure, and wherein the enclosures formed by the body portion and the lid portion define a single continuous enclosure in the assembled combination of the container and work stand.

7. The combination as defined in claim 6, wherein the support means comprise a plurality of discrete mounting pads within the enclosure formed by the lid portion, the selected locations of which align with corresponding means on the like component when the like component is to be supported in its desired position.

8. The combination as defined in claim 6, further comprising:
   f. securing means for securing, in the desired position, the like component to the support means wherein the support means comprise a plurality of discrete mounting pads within the enclosure formed by the lid portion, the selected locations of which align with corresponding means on the like component when the like component is to be supported in its desired position.

* * * * *